(12) United States Patent
Wort et al.

(10) Patent No.: US 12,055,764 B2
(45) Date of Patent: Aug. 6, 2024

(54) SYSTEM AND METHOD FOR OPTICAL TRANSMISSION OF DATA BETWEEN TOROIDAL RINGS

(71) Applicant: General Dynamics Land Systems—Canada Corporation, Ottawa (CA)

(72) Inventors: Philip Michael Wort, Ottawa (CA); James Hugh Lougheed, Ottawa (CA)

(73) Assignee: General Dynamics Land Systems—Canada, Ottawa (CA)

( * ) Notice: Subject to any disclaimer, the term of this patent is extended or adjusted under 35 U.S.C. 154(b) by 317 days.

(21) Appl. No.: 17/657,224

(22) Filed: Mar. 30, 2022

(65) Prior Publication Data

US 2023/0314720 A1 Oct. 5, 2023

(51) Int. Cl.
*G02B 6/36* (2006.01)
*F21V 8/00* (2006.01)

(52) U.S. Cl.
CPC ......... *G02B 6/3604* (2013.01); *G02B 6/0006* (2013.01); *G02B 6/001* (2013.01); *G02B 6/0073* (2013.01)

(58) Field of Classification Search
CPC ...... G02B 6/36; G02B 6/3604; G02B 6/0006; G02B 6/001; G02B 6/0073
See application file for complete search history.

(56) References Cited

U.S. PATENT DOCUMENTS

| | | |
|---|---|---|
| 4,165,913 A | 8/1979 | Fitch |
| 4,277,134 A | 7/1981 | Upton |
| 4,278,323 A | 7/1981 | Waldman |
| 4,557,552 A | 12/1985 | Newton et al. |
| 4,749,249 A | 6/1988 | Hockaday et al. |
| 4,753,506 A | 6/1988 | Einhorn et al. |
| 5,410,628 A | 4/1995 | Paton et al. |
| 5,535,033 A | 7/1996 | Guempelein et al. |
| 6,246,810 B1* | 6/2001 | Harris ................. G02B 6/3604 398/112 |
| 7,376,298 B2* | 5/2008 | Schilling ............. G02B 6/3604 385/32 |
| 2012/0237198 A1 | 9/2012 | Bowman |
| 2014/0341505 A1* | 11/2014 | Cottrell ............... G02B 6/3604 385/26 |

(Continued)

FOREIGN PATENT DOCUMENTS

| | | |
|---|---|---|
| DE | 2441359 A1 | 3/1976 |
| WO | 2005050879 A1 | 6/2005 |

*Primary Examiner* — Tina M Wong
(74) *Attorney, Agent, or Firm* — Lorenz & Kopf, LLP

(57) ABSTRACT

Communications systems and methods for communicating data are provided. In one example, the communications system includes an outer ring having an inner surface and an inner ring having an outer surface. The inner surface and the outer surface are separated by a gap that extends around the inner ring to define a loop. A modulating light arrangement receives data and produces modulated light. A first light diffusing optical fiber and a second light diffusing optical fiber are disposed on a first side of the gap and extend in the loop to define an optical data ring. The first light diffusing optical fiber and the second light diffusing optical fiber cooperate to diffuse the modulated light along the optical data ring. A detector is disposed on the second side of the gap and detects the diffuse modulated light.

20 Claims, 3 Drawing Sheets

(56) References Cited

U.S. PATENT DOCUMENTS

2016/0154161 A1\* 6/2016 Chang .................... G02B 6/001
362/558
2020/0271750 A1 8/2020 Holleczek et al.

\* cited by examiner

SYSTEM AND METHOD FOR OPTICAL TRANSMISSION OF DATA BETWEEN TOROIDAL RINGS

TECHNICAL FIELD

The technical field relates generally to optical transmission of data between two moving objects, and more particularly, relates to systems and methods for providing a robust optical communications channel between an outer toroidal ring and an inner toroidal ring wherein one of the toroidal rings is rotationally movable with respect to the other toroidal ring.

BACKGROUND

Reliable communications between a fixed object and a movable object have often proved challenging. This is particularly problematic in a structure where an outer portion of the structure rotates around an inner portion of the structure and line of sight connections between the two portions are continuously disrupted. For example, an armored vehicle turret typically includes a majority of the vehicles weapons, communications and sensor systems, but is required to freely rotate with respect to the vehicle hull, or body. Systems within the vehicle hull provide power to the systems within the vehicle turret and digital communications must be enabled between the turret and the hull. Typically, this electrical power and other digital signals is conducted through a slip ring assembly mounted on the rotational axis below the turret basket. This assembly may include insulated electrical brushes mounted circularly around a set of insulated rings that rotate with the vehicle turret. This assembly includes bearings, springs, seals and other components and is therefore elaborate & expensive.

As the complexity of computer-controlled systems, data capture, and automation increases, the amount of data required to be transmitted across this freely moving rotational interface increases. Improvements in electronically controlled vehicle drive systems, vehicle electronics, sensors, defense systems, displays and video exchanged between turret & hull have significantly increased the amount of digital communication between the current rotor and stator system, adding to the already substantial information transmitted between the vehicle hull and turret rendering the current systems insufficient, with low bandwidth and limited space for more contacts.

Accordingly, it is desirable to overcome these problems and provide a robust and cost effective system for enabling high bandwidth communications between an inner surface and an outer surface that rotate relative to each other. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a communications system and a method for communicating data are provided herein.

In a first non-limiting embodiment, the communications system includes, but is not limited to, an outer ring oriented in a first plane and having an inner surface. The communications system further includes, but is not limited to, an inner ring oriented in the first plane having an outer surface and is positioned within the outer ring such that the inner surface and the outer surface are separated by a gap that extends around the inner ring to define a loop. The gap has a first side adjacent to one of the inner surface and the outer surface and a second side adjacent to the other one of the inner surface and the outer surface. The communications system further includes, but is not limited to, a modulating light arrangement that is configured to receive data and produce modulated light in response to the data. The communications system further includes, but is not limited to, a first light diffusing optical fiber and a second light diffusing optical fiber that are each disposed on the first side of the gap and that extend in different directions in the loop to define an optical data ring that surrounds the inner ring. The first light diffusing optical fiber and the second light diffusing optical fiber are each in communication with the modulating light arrangement to receive respective portions of the modulated light and are cooperatively configured to diffuse the modulated light along the optical data ring. The communications system further includes, it is not limited to, a detector that is disposed on the second side of the gap facing the optical data ring. The detector is configured to detect the modulated light diffused from the optical data ring to communicate the data between first and second sides of the gap.

In another non-limiting embodiment, the method includes, but is not limited to, transmitting the data to a modulating light arrangement. The modulating light arrangement produces modulated light in response to the data. The method further includes, but is not limited to, communicating respective portions of the modulated light to a first light diffusing optical fiber and a second light diffusing optical fiber. The first light diffusing optical fiber and the second light diffusing optical fiber are each disposed on a first side of a gap that is defined between an inner surface of an outer ring that is oriented in a first plane and an outer surface of an inner ring that is oriented in the first plane and positioned within the outer ring. The gap extends around the inner ring to define a loop and the first side of the gap is adjacent to one of the inner surface and the outer surface and the second side of the gap is adjacent to the other one of the inner surface and the outer surface. The first light diffusing optical fiber and the second light diffusing optical fiber each extend in different directions in the loop to define an optical data ring that surrounds the inner ring and that diffuses the modulated light. The method further includes, but is not limited to, detecting the modulated light diffused from the optical data ring with a detector that is disposed on the second side of the gap facing the optical data ring to communicate the data between first and second sides of the gap.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
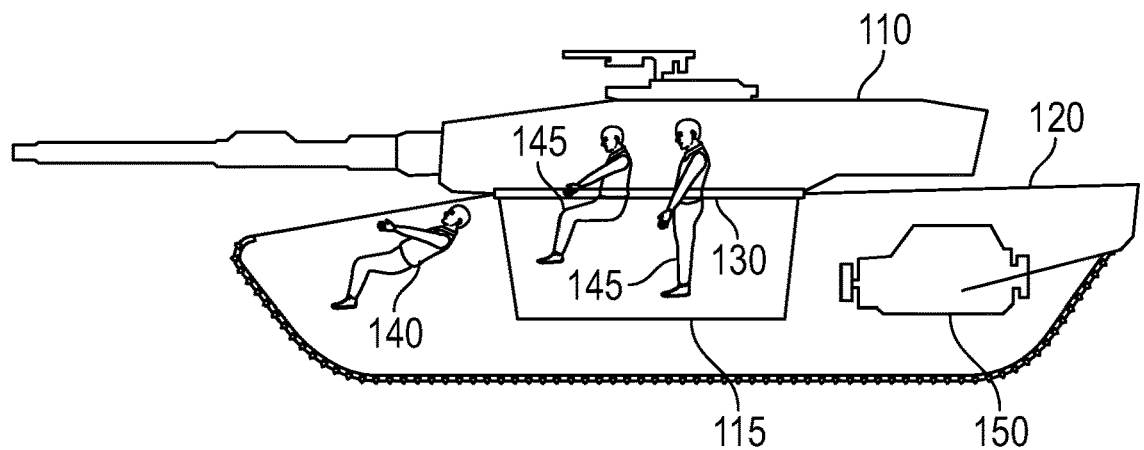
FIG. 1 illustrates an exemplary vehicle for employing the method and system for communicating data between an outer toroidal ring and an inner toroidal ring in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to communications systems and methods for communicating data. In an exemplary embodiment, the communications system includes an outer ring oriented in a first plane and having an inner surface. An inner ring is oriented in the first plane having an outer surface and is positioned within the outer ring such that the inner surface and the outer surface are separated by a gap (e.g., air gap) that extends around the inner ring to define a loop. The gap has a first side adjacent to either the inner surface or the outer surface and a second side is adjacent to the other of the inner surface or the outer surface. A modulating light arrangement receives data and produces modulated light in response to the data. A first light diffusing optical fiber and a second light diffusing optical fiber are each disposed on the first side of the gap and extend in different directions (e.g., clockwise and counterclockwise) in the loop to form an optical data ring that surrounds the inner ring. The first light diffusing optical fiber and the second light diffusing optical fiber are each in communication with the modulating light arrangement to receive respective portions of the modulated light and cooperate to diffuse the modulated light along the optical data ring. A detector is disposed on the second side of the gap facing the optical data ring and detects the modulated light diffused from the optical data ring to communicate the data between first and second sides of the gap.

In an exemplary embodiment, the communications system and method advantageously uses modulated light across an air gap to achieve high bandwidth data communication with tolerance to any misalignment and immunity to electrical interferences. Further, this non-contact signal coupling is absence of any mechanical wear, eliminates any contact replacement, ring cleaning, periodic inspection and other maintenance that is often associated with conventional contact signal couplings. Such communications systems and methods have broad applications where a robust communications channel is needed between toroidal rings or other moving objects. For example, the communications system and method may be used in applications for medical or industrial machines or devices requiring a hollow bore, for instance, tomography scanners where a patient or sample must pass through the center while imaging sources and detectors rotate outside (e.g., magnetic resonance imaging (MRI)). Further, the communications system and method have utility in applications for military vehicles, for example the system may be embed or combine with other mechanisms at a turret-hull interface, such as a drive system or support bearings of an armored vehicle. In an exemplary embodiment, the communications system and method can advantageously provide a fast Ethernet connection (e.g., Gigabit Ethernet GigE, 100Base-T, or the like) for a tank turret. Full duplex communication may be supplied by providing two stacked optical data rings and incorporating electronic/optical transducers to ensure it is electrically transparent to the network. The light paths are immune to strong radio and electrical emissions, do not radiate interference into nearby equipment and are secure from interception. Further, the communications system operates continuously and imposes no limits on turret angle or rotation speed. Yet another advantage of the various embodiments disclosed herein is that existing vehicles can be retrofitted with the communications system. For example, slipping two half-loop optical data ring sections into the bearing ring may be particularly attractive by avoiding the need to lift the turret in order to retrofit a vehicle with the communications system.

FIG. 1 schematically illustrates an exemplary vehicle 100 for employing the communications system and method for communicating data in accordance with an exemplary embodiment. The exemplary vehicle 100, such as an armored vehicle, may include a turret 110, a turret basket 115, a hull 120, a turret drive ring 130. The exemplary vehicle 100 may be driven by a driver 140 with additional crew members 145 in the turret basket 115.

In modern tanks, the turret 110 may house the crew members 145 engaged in command of the vehicle and operation of the weapons and communications systems other than the driver 140 who is typically located in a driver's compartment in the hull 120. The vehicle engine 150 is typically located in an engine compartment in the rear of the hull 120 and is coupled to drive wheels on the exterior of the hull 120 for driving the tracks to move the vehicle 100. The turret 110 is conventionally rotated by the turret drive ring 130 which is a mechanical drive using a toroidal (ring) gear on its circumference and driven by a hull-mounted motor through a spur gear. Alternatively, a turret mounded motor may drive turret rotation and a hull mounted ring gear.

Since electrical power is derived from the operation of the engine 150 and stored in batteries typically located in the hull 120, electric power to power the weapons, communications, targeting systems, and other electronics in the turret 110 must be transmitted between the stationary hull 120 and the rotating turret 110. In addition, communications between the driver and the crew members 145 in the turret 110 and high-speed communications between the turret systems and vehicle drive systems and the like must be enabled. Traditional communications interfaces, such as slip ring assemblies using brushes and electrical contacts have not been able to reliably provide the high-speed communications required for increasing complex modern systems.

Figure 2:
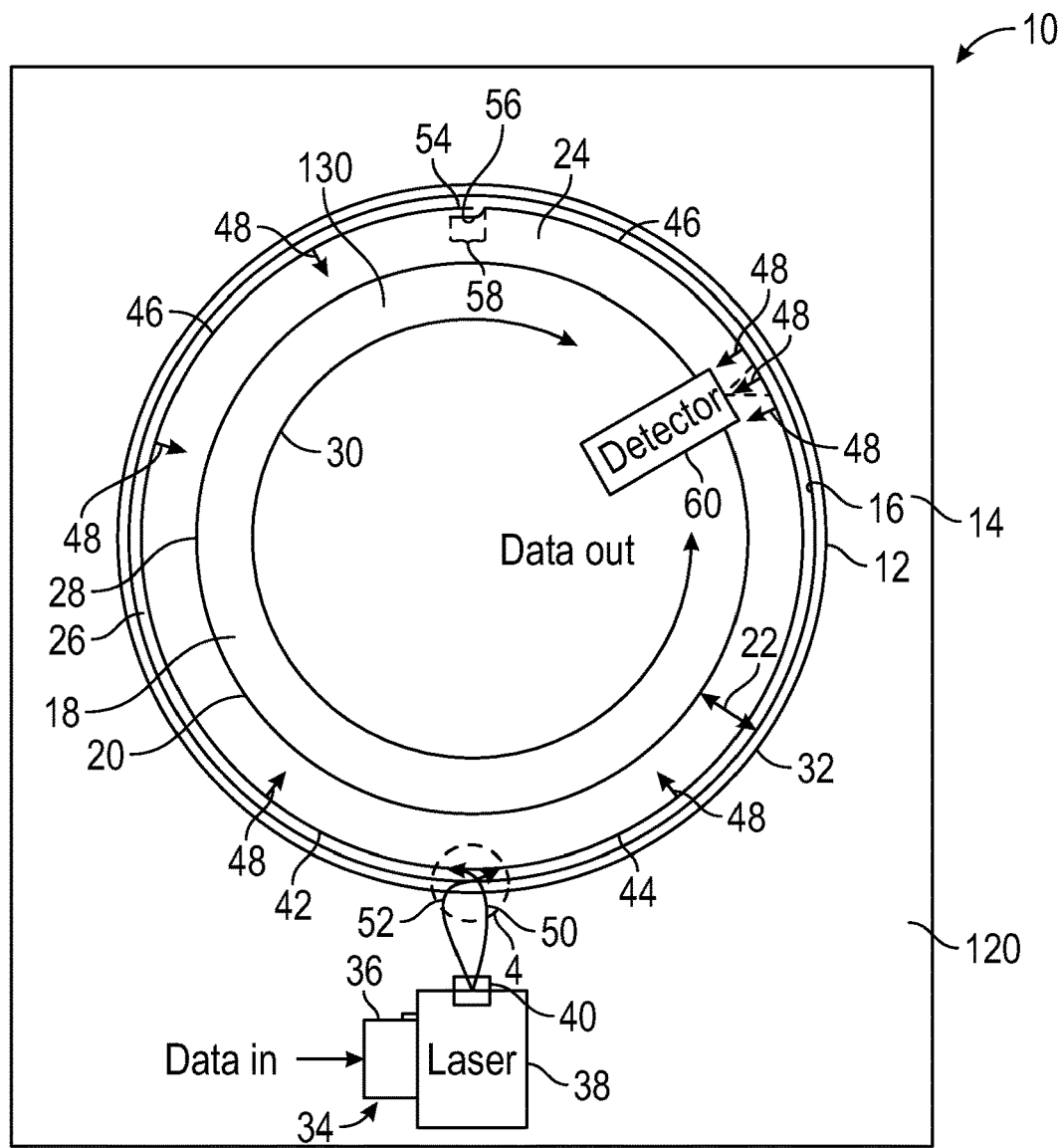
FIG. 2 illustrates a system for communicating data between an outer toroidal ring and an inner toroidal ring in accordance with an exemplary embodiment.

FIG. 2 illustrates a communications system 10 for communicating data in accordance with an exemplary embodiment. As discussed above, the communications system 10 has broad applications including having utility in applications for medical or industrial machines or devices and military vehicles. Further, although some of the discussion below will be directed to applications in a military vehicle 110, it is to be understood that the communications system 10 may otherwise form part of a medical or industrial device where a robust communications channel(s) is needed between toroidal rings or other moving objects.

Referring to FIG. 2, the communications system 10 includes an outer ring 12 oriented in a plane 14 and having an inner surface 16. An inner ring 18 is oriented in the plane 14 and has an outer surface 20. The inner ring 18 is positioned within the outer ring 12 such that the inner surface 16 and the outer surface 20 are separated by a gap (indicated by double-headed arrow 22) that extends around the inner ring 18 to define a loop 24 (e.g., circular air gap or channel). The gap 22 has opposing sides 26 and 28. As illustrated, side 26 of the gap 22 is adjacent to the inner surface 16 of the outer ring 12 and side 28 of the gap 22 is adjacent to the outer surface 20 of the inner ring 18.

In an exemplary embodiment, the inner ring 18 is rotatable with respect to the outer ring 20 along a plane of rotation (indicated by double-headed arrow 30) that is parallel to the plane 14. Referring to FIGS. 1-2, in an exemplary embodiment, the inner ring 18 forms a portion of a rotor (e.g., turret drive ring 130) coupled to the turret 110 of the vehicle 100 and the outer ring 12 forms a portion of a stator 32 (e.g., fixed portion) coupled to the vehicle hull 120 where the rotor 130 and stator 32 are configured to rotate the turret 110 with respect to the vehicle hull 120.

Referring to FIG. 2, the communications system 10 includes a modulating light arrangement 34 that receives data and produces modulated light in response to the data. In an exemplary embodiment, the modulating light arrangement 34 includes a modulator 36 and a light source 38. The modulator 36 receives the data and produces a modulated electrical output in response to the data. The light source 38 is in communication with the modulator 36 to receive the modulated electrical output and produces the modulated light in response to the modulated electrical output. In an exemplary embodiment, the light source 38 is or includes a light emitting diode(s) (LED), a laser, a LED laser, or the like. As will be discussed in further detail below, in an exemplary embodiment, the modulator 36 is or includes a modem that is coupled to the ethernet for communication of data. Optionally, a splitter 40 in communication with the light source 38 may be used to split the modulated light.

Disposed adjacent to the side 26 of the gap 22 are light diffusing optical fibers 42 and 44 that extend in different directions (e.g., clockwise and counterclockwise) in the loop 24 to define an optical data ring 46 that surrounds the inner ring 18. The light diffusing optical fibers 42 and 44 are each in communication with the modulating light arrangement 34, for example, coupled to and in communication with the splitter 40, to receive respective or split portions of the modulated light. In an exemplary embodiment, the light diffusing optical fibers 42 and 44 cooperate to diffuse the modulated light (indicated by single-headed arrows 48) along the optical data ring 46.

More generally, light diffusing optical fibers, also known as "leaky fibers," are specially constructed optical fibers, which are made from glass, plastic, or other transparent material, that interfere with the light transport along its length to "leak" energy (light) from the core of the fiber by directing rays at a steep enough angle that the rays exit the core and cladding (e.g., fiber shell or outer layer) of the fiber. In some constructions, the light diffusing optical fibers have discontinuities in the fiber's core to scatter a small portion of the passing light towards the fiber's cladding. For example, Fibrance® light diffusing optical fibers, which are commercially available from Corning Incorporated, use nanoparticles in the core glass to extrude a fiber that glows along its entire length. Other light diffusing optical fibers are commercially available from Versalume LLC, located in Santa Clara, California. Any light passing through light diffusing optical fibers is uniformly diffused along its entire diffusion length. To maximize conversion of the source light power to the leakage light, the diffusion length should match the usable length of the fiber such that little unused light remains in the core at the distal most end the fiber. Further and as will be discussed below, in an exemplary embodiment, a reflector(s) may be arranged adjacent to the light diffusing optical fiber to reflect some of the diffused light along the length of the fiber towards a detector to increase strength of the diffused light received by the detector to increase the strength of coupled light (signal coupling).

As illustrated, the light diffusing optical fibers 42 and 44 have proximal end portions 50 and 52 that each receive the respective portion (e.g., about 50%) of the modulated light. The light diffusing optical fibers 42 and 44 extend from their proximal end portions 50 and 52 in the different directions along their length around respective sections of the loop to distal end portions 54 and 56. As discussed above, the light diffusing optical fibers 42 and 44 diffuse their respective portions of the modulated light 48 along their entire lengths.

In an exemplary embodiment, each of the light diffusing optical fibers 42 and 44 have a length sufficient to extend about half of the distance around the loop 24. As illustrated, the light diffusing optical fiber 42 extends in a clockwise direction while the light diffusing optical fiber 44 extends in a counterclockwise direction through different sections of the loop 24 that correspond to opposing halves of the loop 24. Further, the distal end portions 54 and 56 of the light diffusing optical fibers 42 and 44 overlap to define an overlap zone 58 that is disposed opposite from the proximal end portions 50 and 52.

In an exemplary embodiment, advantageously this light diffusing optical fiber layout substantially equalizes pulse arrival times of the modulated light from the proximal end portions 50 and 52 to the 180° overlap zone 58 to provide a robust and cost effective system for enabling high bandwidth communications. That is, by encircling the loop 24 with two half loop-light diffusing optical fibers 42 and 44, the differential delay of received light pulses is almost eliminated at all locations around the loop 24. The identical pulses of modulated light travel from the light source 38 (e.g., launch point) into the two half loop-light diffusing optical fibers 42 and 44 and arrives at the far distal end portions 54 and 56, e.g., the overlap zone 58, at the same time. The overlap zone 58 can be as short as the detector field-of-view to minimize differential delay contributions at pulse transitions. For the military vehicle ring example discussed above in relation to FIG. 1, using a detector 60, as discussed in further detail below, spaced for example 6 mm away with a 45° field-of-view raises the maximum theoretical limit for bandwidth communications due to differential delay at the overlap zone 58 to around 20 GHz. Further and as previously discussed, the two half loop-light diffusing optical fibers 42 and 44 may be advantageously employed to retrofit existing vehicles with the communications system 10. For example, slipping the two half loop-light diffusing optical fibers 42 and 44 into the bearing ring may be particularly attractive by avoiding the need to lift the turret in order to retrofit a vehicle with the communications system 10.

Figure 4:
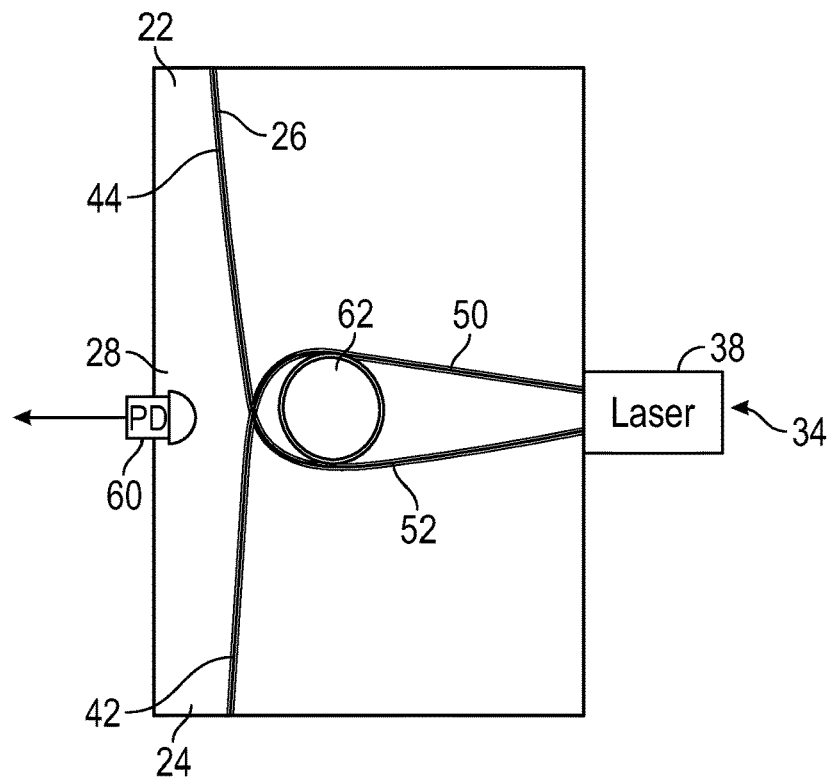
FIG. 4 illustrates a portion of the system depicted in FIG. 2.

Referring also to FIG. 4, in an exemplary embodiment, a curved guide 62 (e.g., cylindrical guide or mandrel) is disposed between the modulating light arrangement 34 and the optical data ring 46. To ensure that the light diffusing optical fibers 42 and 44 do not bend below a critical radius (which could damage the fibers) between the modulating light arrangement 34 and the optical data ring 46, the proximal end portions 50 and 52 of the light diffusing optical fibers 42 and 44 are positioned about the curved guide 62 directed or otherwise guided towards the optical data ring 46 to extend in the different directions in the loop 24. Further, the light diffusing optical fibers 42 and 44 may be coupled to the inner surface 16 using, for example, a continuous or a plurality of spaced apart sections of transparent tubing, for example clear plastic tubing, that holds the fibers and that has wings for attaching to the inner surface 16 of the outer ring 12. Other conventional means for attaching optical fibers to a surface may also be used.

As briefly mentioned above, the communications system 10 further includes the detector 60. As illustrated, the detector 60 is disposed on the side 26 of the gap 22 facing the optical data ring 46. The detector 60 detects the modulated light 48 diffused from the optical data ring 46 regardless of the rotational position of the inner ring 18 relative to the outer ring 12 to ensure communicating the data between the sides 26 and 28 of the gap 22. The detector 60 produces a modulated electrical output in response to the detected modulated light for subsequent demodulation as discussed in further detail below. In an exemplary embodiment, the detector is or includes a photodiode.

Figure 3:
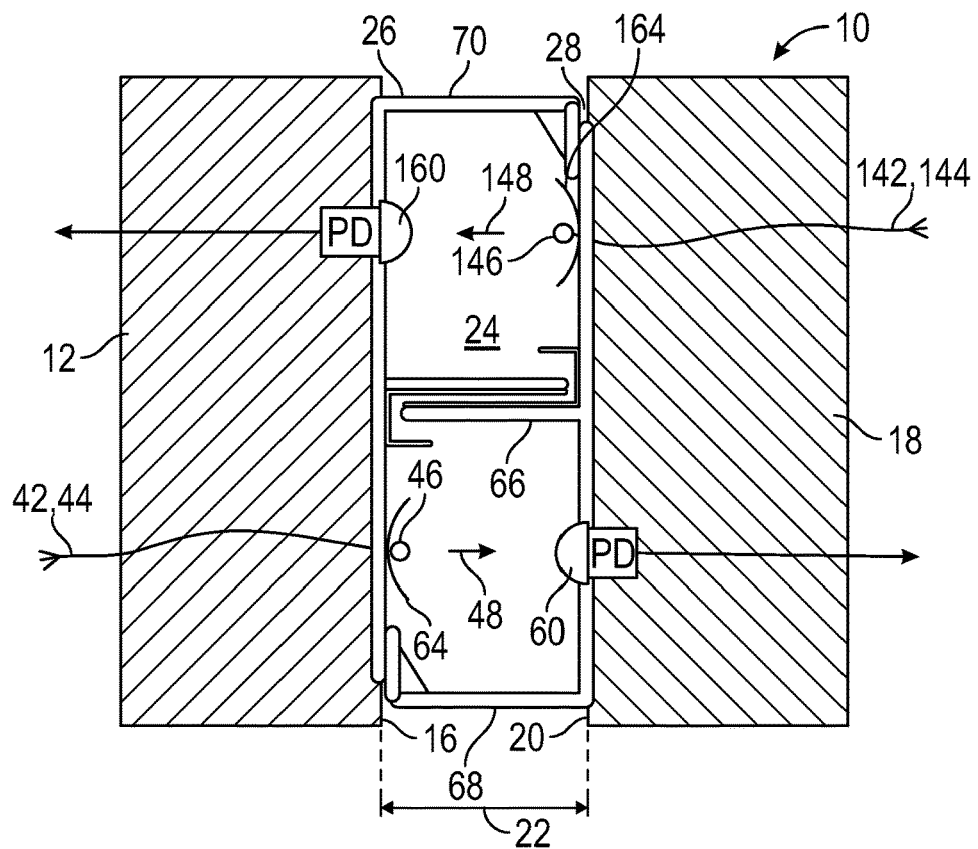
FIG. 3 illustrates a cross-sectional view of a system for communicating data between an outer toroidal ring and an inner toroidal ring in accordance with an exemplary embodiment.
Figure 5:
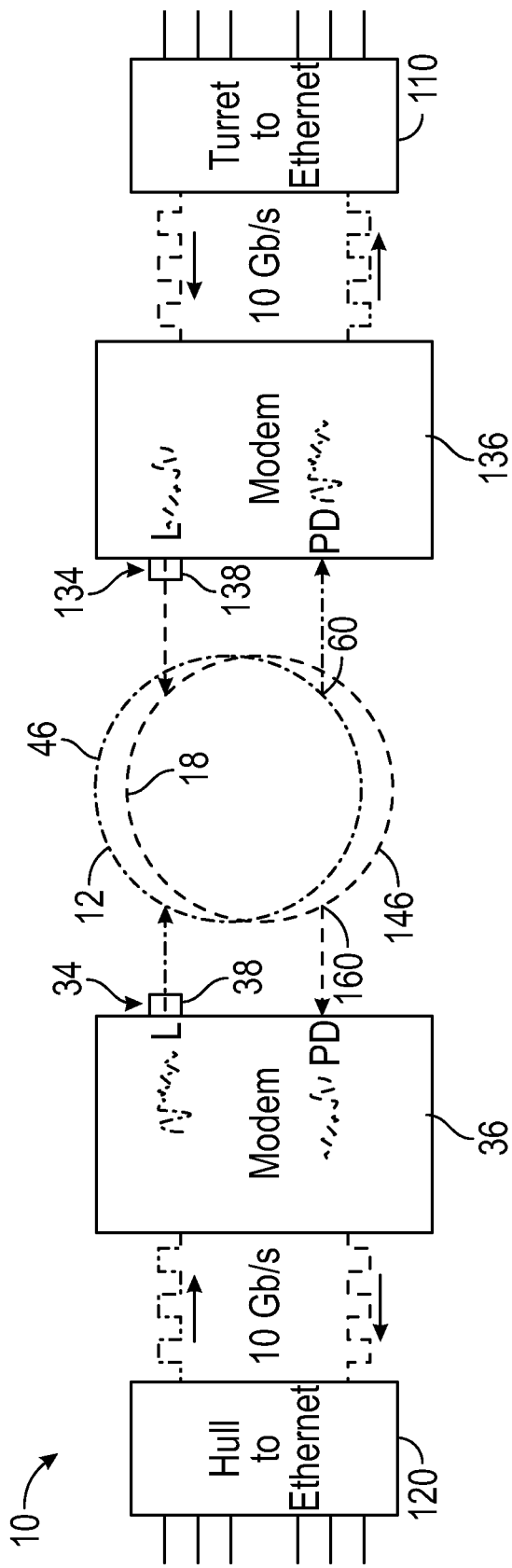
FIG. 5 illustrates a system for communicating data between an outer toroidal ring and an inner toroidal ring in accordance with an exemplary embodiment.

Referring to FIGS. 3 and 5, in an exemplary embodiment, the communications system 10 is a duplex communications system including two stacked optical data rings 46 and 146 and which incorporates electronic/optical transducers or detectors 60 and 160 to ensure it is electrically transparent to the ethernet network. As illustrated, an additional modulating light arrangement 134 configured similar to the modulating light arrangement 34 discussed above including an additional light source 138 and modulator 136. The modulating light arrangement 134 receives additional data, for example from the ethernet of the turret 110, and produces modulated light in response to the data. Light diffusing optical fibers 142 and 144 are each disposed on the side 28 of the gap 22 and extend in different directions (e.g., clockwise and counterclockwise) in the loop 24 to define the optical data ring 146 that surrounds the inner ring 18. Similar to the light diffusing optical fibers 42 and 44, light diffusing optical fibers 142 and 144 are each in communication with the modulating light arrangement 134 to receive respective portions of the modulated light and are cooperatively configured to diffuse the modulated light (indicated by single-headed arrow 146) along the optical data ring 146. Reflectors 64 and 164 may be disposed correspondingly behind the optical data rings 46 and 146 to focus the diffused modulated light 48 and 148 respectively towards the detectors 60 and 160. As illustrated, the detector 160 is disposed on the side 26 of the gap 22 facing the optical data ring 146 to detect the modulated light 148 diffused from the optical data ring 146 to transfer the data between sides 26 and 28 of the gap 22 in the direction opposite the data/modulated light transferred between the optical data ring 46 and the detector 60.

Advantageously, in an exemplary embodiment, an optical labyrinth 66 or shield is disposed in the gap 22 between the optical data rings 46 and 146 to prevent the detector 60 from detecting the modulated light 148 diffused from the optical data ring 146 and likewise, the detector 160 from detecting the modulated light 48 diffused from the optical data ring 46. Alternatively, or in addition, the modulating light arrangements 34 and 134 can each produce corresponding modulated light at different wavelengths/frequencies, for example each distinctly different in the 400 to 1,000 nm range. Further, sliding seals 68 and 70 may be disposed in the gap 22 spaced apart from each other. As illustrated, the optical data rings 46 and 146, the detectors 60 and 160 are disposed between the sliding seals 68 and 70, which extend between the inner and outer surfaces 16 and 20, to prevent debris from entering into the gap 22 anywhere along the loop 24.

Referring to FIG. 5, in an exemplary embodiment, the modulator 36 additionally functions as a demodulator for converting the modulated electrical output from the detector 160 to data for communication to the ethernet of the hull 120. Likewise, the modulator 136 additionally functions as a demodulator for converting the modulated electrical output from the detector 60 to data for communication to the ethernet of the turret 110.

Figure 6:
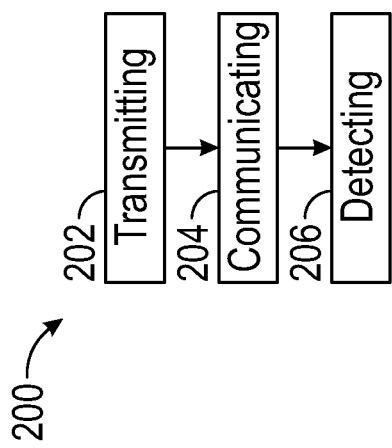
FIG. 6 illustrates a method for communicating data between an outer toroidal ring and an inner toroidal ring in accordance with an exemplary embodiment.

FIG. 6 illustrates a method 200 for communicating data between an outer toroidal ring and an inner toroidal ring in accordance with an exemplary embodiment. The method 200 includes transmitting (STEP 202) the data to a modulating light arrangement. The modulating light arrangement produces modulated light in response to the data. Respective portions of the modulated light are communicated (STEP 204) to a first light diffusing optical fiber and a second light diffusing optical fiber. The first light diffusing optical fiber and the second light diffusing optical fiber are each disposed on a first side of a gap that is defined between an inner surface of an outer ring that is oriented in a first plane and an outer surface of an inner ring that is oriented in the first plane and positioned within the outer ring. The gap extends around the inner ring to define a loop and the first side of the gap is adjacent to one of the inner surface and the outer surface and the second side of the gap is adjacent to the other one of the inner surface and the outer surface. The first light diffusing optical fiber and the second light diffusing optical fiber each extend in different directions in the loop to define an optical data ring that surrounds the inner ring and that diffuses the modulated light. The modulated light diffused from the optical data ring is detected (STEP 206) with a detector that is disposed on the second side of the gap facing the optical data ring to communicate the data between first and second sides of the gap.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A communications system comprising:
an outer ring oriented in a first plane and having an inner surface;
an inner ring oriented in the first plane having an outer surface and positioned within the outer ring such that the inner surface and the outer surface are separated by a gap that extends around the inner ring to define a loop, wherein the gap has a first side adjacent to one of the inner surface and the outer surface and a second side adjacent to the other one of the inner surface and the outer surface;
a modulating light arrangement configured to receive data and produce modulated light in response to the data;
a first light diffusing optical fiber and a second light diffusing optical fiber each disposed on the first side of the gap and extending in different directions in the loop to define an optical data ring that surrounds the inner ring, wherein the first light diffusing optical fiber and the second light diffusing optical fiber are each in communication with the modulating light arrangement to receive respective portions of the modulated light and are cooperatively configured to diffuse the modulated light along the optical data ring; and a detector disposed on the second side of the gap facing the optical data ring and configured to detect the modulated light diffused from the optical data ring to communicate the data between first and second sides of the gap.

2. The communications system of claim 1, wherein the inner ring is rotatable with respect to the outer ring and has a plane of rotation parallel to the first plane.

3. The communications system of claim 1, wherein the first light diffusing optical fiber has a first proximal end portion configured to receive a first portion of the modulated light and extends from the first proximal end portion in a first direction along a first length around a first section of the loop to a first distal end portion, wherein the first light diffusing optical fiber is configured to diffuse the first portion of the modulated light along the first length, wherein the second light diffusing optical fiber has a second proximal end portion configured to receive a second portion of the modulated light and extends from the second proximal end portion in a second direction along a second length around a second section of the loop to a second distal end portion, wherein the second light diffusing optical fiber is configured to diffuse the second portion of the modulated light along the second length.

4. The communications system of claim 3, wherein the first direction is one of a clockwise direction and a counterclockwise direction, and the second direction is the other one of the clockwise direction and the counterclockwise direction.

5. The communications system of claim 3, wherein the first and second sections of the loop form opposing halves of the loop.

6. The communications system of claim 3, wherein the first and second distal end portions of the first and second light diffusing optical fibers overlap to define an overlap zone that is disposed opposite from the first and second proximal end portions.

7. The communications system of claim 3, further comprising a curved guide disposed between the modulating light arrangement and the optical data ring, wherein the first and second proximal end portions of the first and second light diffusing optical fibers are positioned about the curved guide directed towards the optical data ring to extend in the first and second directions around the first and second sections, respectively, of the loop.

8. The communications system of claim 1, wherein the modulating light arrangement comprises:

a modulator that receives the data and produces a modulated electrical output in response to the data; and a light source in communication with the modulator to receive the modulated electrical output and produces the modulated light in response to the modulated electrical output.

9. The communications system of claim 8, wherein the light source includes one of a light emitting diode(s) (LED) and a laser.

10. The communications system of claim 8, wherein the modulator includes a modem.

11. The communications system of claim 8, further comprising a splitter that is in communication with the light source to split the modulated light into the respective portions for the first and second light diffusing optical fibers.

12. The communications system of claim 1, wherein the detector includes a photodiode.

13. The communications system of claim 1, wherein the detector is configured to produce a modulated electrical output in response to the detected modulated light, and wherein the communications system further comprises a demodulator that is in communication with the detector for converting the modulated electrical output to the data.

14. The communications system of claim 1, wherein the first side of the gap is adjacent to the inner surface of the outer ring and the second side of the gap is adjacent to the outer surface of the inner ring, and wherein the communications system further comprises:

an additional modulating light arrangement configured to receive additional data and produce additional modulated light in response to the additional data;

a third light diffusing optical fiber and a fourth light diffusing optical fiber each disposed on the second side of the gap and extending in different directions in the loop to define an additional optical data ring that surrounds the inner ring, wherein the third light diffusing optical fiber and the fourth light diffusing optical fiber are each in communication with the additional modulating light arrangement to receive respective portions of the additional modulated light and are cooperatively configured to diffuse the additional modulated light along the additional optical data ring; and an additional detector disposed on the first side of the gap facing the additional optical data ring and configured to detect the additional modulated light diffused from the additional optical data ring to transfer the additional data between first and second sides of the gap.

15. The communications system of claim 14, further comprising an optical labyrinth disposed in the gap between the optical data ring and the additional optical data ring and configured to prevent the detector from detecting the additional modulated light diffused from the additional optical data ring and the additional detector from detecting the modulated light diffused from the optical data ring.

16. The communications system of claim 15, wherein the modulating light arrangement produces the modulated light at a first wavelength and the additional modulating light arrangement produces the additional modulated light and a second wavelength that is different from the first wavelength.

17. The communications system of claim 15, further comprising a first sliding seal disposed in the gap and a second sliding seal disposed in the gap spaced apart from the first sliding seal, and wherein the optical data ring, the detector, the additional optical data ring, and the additional detector are disposed between the first and second sliding seals.

18. The communications system of claim 1 forms part of a medical device.

19. The communications system of claim 1 forms part of a military vehicle, wherein the inner ring forms a portion of a rotor coupled to a turret and the outer ring forms a portion of a stator coupled to a vehicle hull, and wherein the rotor and stator are configured to rotate the turret with respect to the vehicle hull.

20. A method for communicating data, the method comprising the steps of:

transmitting the data to a modulating light arrangement, wherein the modulating light arrangement produces modulated light in response to the data;

communicating respective portions of the modulated light to a first light diffusing optical fiber and a second light diffusing optical fiber, wherein the first light diffusing optical fiber and the second light diffusing optical fiber are each disposed on a first side of a gap that is defined between an inner surface of an outer ring that is oriented in a first plane and an outer surface of an inner ring that is oriented in the first plane and positioned within the outer ring, wherein the gap extends around the inner ring to define a loop and the first side of the gap is adjacent to one of the inner surface and the outer surface and the second side of the gap is adjacent to the other one of the inner surface and the outer surface, and wherein the first light diffusing optical fiber and the second light diffusing optical fiber each extend in different directions in the loop to define an optical data ring that surrounds the inner ring and that diffuses the modulated light; and detecting the modulated light diffused from the optical data ring with a detector that is disposed on the second side of the gap facing the optical data ring to communicate the data between first and second sides of the gap.

* * * * *